US007656599B2

United States Patent
Abe et al.

(10) Patent No.: US 7,656,599 B2
(45) Date of Patent: Feb. 2, 2010

(54) CONTROL APPARATUS, STORAGE APPARATUS, AND COMPUTER PRODUCT

(75) Inventors: Yukio Abe, Kawasaki (JP); Takeshi Hara, Kawasaki (JP); Mitsuo Kamimura, Kawasaki (JP); Shunji Saitoh, Higashine (JP)

(73) Assignee: Toshiba Storage Device Corporation, Tokyo (JP)

( * ) Notice: Subject to any disclaimer, the term of this patent is extended or adjusted under 35 U.S.C. 154(b) by 416 days.

(21) Appl. No.: 11/700,491

(22) Filed: Jan. 31, 2007

(65) Prior Publication Data

US 2008/0055765 A1    Mar. 6, 2008

(30) Foreign Application Priority Data

Aug. 29, 2006   (JP)   ............................. 2006-232318

(51) Int. Cl.
 G11B 27/36  (2006.01)
(52) U.S. Cl. .......................................... 360/31; 360/75
(58) Field of Classification Search ........................ None
 See application file for complete search history.

(56) References Cited

U.S. PATENT DOCUMENTS 6,442,715 B1 *  8/2002  Wilson ........................ 714/710
6,975,467 B1 * 12/2005  Lewkowicz et al. ........... 360/31
7,174,478 B2 *  2/2007  Asano ............................ 714/8

FOREIGN PATENT DOCUMENTS

| JP | 05-020789    | 1/1993 |
| JP | 06-052636    | 2/1994 |
| JP | 2001-014606  | 1/2001 |
| JP | 2004-047023  | 2/2004 |

* cited by examiner

*Primary Examiner*—Jason C Olson
(74) *Attorney, Agent, or Firm*—Greer, Burns & Crain, Ltd.

(57) ABSTRACT

A rewrite determining unit of a hard disk apparatus acquires a servo signal that includes an offtrack amount corresponding to each servo frame from a position information memory, and determines whether a write fault has occurred based on the servo signal. If a write fault has occurred, the rewrite determining unit determines a rewrite sector count, and a write controller controls a hard disk controller so that rewriting is performed to correspond to the rewrite sector count determined by the rewrite determining unit.

9 Claims, 6 Drawing Sheets

CONTROL APPARATUS, STORAGE APPARATUS, AND COMPUTER PRODUCT

BACKGROUND OF THE INVENTION

1. Field of the Invention

The present invention generally relates to a data. rewriting technique, and particularly relates to data rewriting control when a write fault occurs.

2. Description of the Related Art

In a conventional magnetic disk apparatus, if a write fault occurs while data is being written, data is rewritten in a predetermined number of sectors located before the sector where the write fault has occurred. A conventional technology has been disclosed, for example, in Japanese Patent Application Laid-open No. H5-20789.

The reason for rewriting the data in the sectors located before the sector where the write fault occurs is as follows. Due to intermittent nature of servo sampling for detecting an offtrack position, if a write fault occurs due to the offtrack position or the like, it is probable that data in sectors between a previous servo frame (where it is assumed that data is written at a normal track position) of a servo frame where the offtrack position is detected and a servo frame where the offtrack position is detected is written off track. Therefore, it is necessary to rewrite the data in the sectors between the two servo frames to a center of a track.

That is why it is necessary to rewrite data in all the sectors that include the servo frame where the write fault caused by the offtrack position is detected.

Generally, a magnetic disk is divided into zones from an outer periphery to an inner periphery to increase a recording density of the magnetic disk. The number of sectors varies in every track from the outermost track to the innermost track in a zone. However, the number of servo frames of all the tracks in a zone is the same to keep the servo sampling constant.

More sectors are present between any two servo frames towards the outer periphery, and smaller sectors are present between any two servo frames towards the inner periphery. However, the maximum number of sectors between two frames in the outermost track is generally set as a fixed value for the number of sectors in which the data is to be rewritten.

The number of sectors in which the data is to be rewritten when a write fault occurs is fixed to the maximum number of sectors between two frames in the outermost track, when a write fault occurs in a track towards the inner periphery, which has fewer sectors between the two servo frames, the sectors in which the data is to be rewritten can span across a plurality of servo frames, which adversely affects the performance of the magnetic disk apparatus.

To realize successful rewriting across the servo frames, the rewriting must be carried out continuously for all the servo frames in the target sectors. However, a rewrite success rate falls proportionally with the number of servo frames in the target sectors.

Furthermore, if the magnetic disk apparatus is subjected to continuous jolts (for example, when a user carries the magnetic disk apparatus on a train), the possibility of continuous success of rewriting is quite low for the servo frames in the target sectors. In such a scenario, finally when rewriting cannot be down within predetermined 'retry time', the write fault is usually unrecoverable.

A magnetic disk apparatus is often installed in a portable device (such as a portable information tool or a portable music player) and likely to be carried on a train, a plane, during walking or during hiking. The magnetic disk apparatus is constantly at risk of being subjected to continuous jolts or to an environment of atmospheric pressure variation. The magnetic disk apparatus is easily affected by the usage environment of the portable device. It is, therefore, essential to ensure successful rewriting of data in the magnetic disk apparatus.

SUMMARY OF THE INVENTION

It is an object of the present invention to at least partially solve the problems in the conventional technology.

According to an aspect of the present invention, a control apparatus that controls a storage apparatus to rewrite data when a write fault occurs while-the data is being written to a storage medium included in the storage apparatus, the control apparatus includes a fault-cause determining unit that determines a cause of the write fault; and a sector-count determining unit that determines number of sectors in which the data is to be rewritten according to the cause.

According to another aspect of the present invention, a storage apparatus that rewrites data when a write fault occurs while the data is being written to a storage medium included in the storage apparatus includes a fault-cause determining unit that determines a cause of the write fault; and a sector-count determining unit that determines number of sectors in which the data is to be rewritten according to the cause.

According to still another aspect of the present invention, a computer-readable recording medium that stores therein a computer program that causes a computer to rewrite data when a write fault occurs while the data is being written to a storage medium included in a storage apparatus, the computer program causing the computer to execute determining a cause of the write fault; and determining number of sectors in which the data is to be rewritten according to the cause.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below with reference to the accompanying drawings. A magnetic disk apparatus will be explained as an example of the storage apparatus according to the embodiments of the present invention.

A magnetic disk apparatus according to an embodiment of the present invention detects an offtrack amount, and appropriately varies the number of sectors in which data is to be rewritten (hereinafter, "rewrite sector count") based on the offtrack amount. The offtrack amount is an amount of shift of a head from a center of a track on the magnetic disk for every servo frame.

Figure 1:
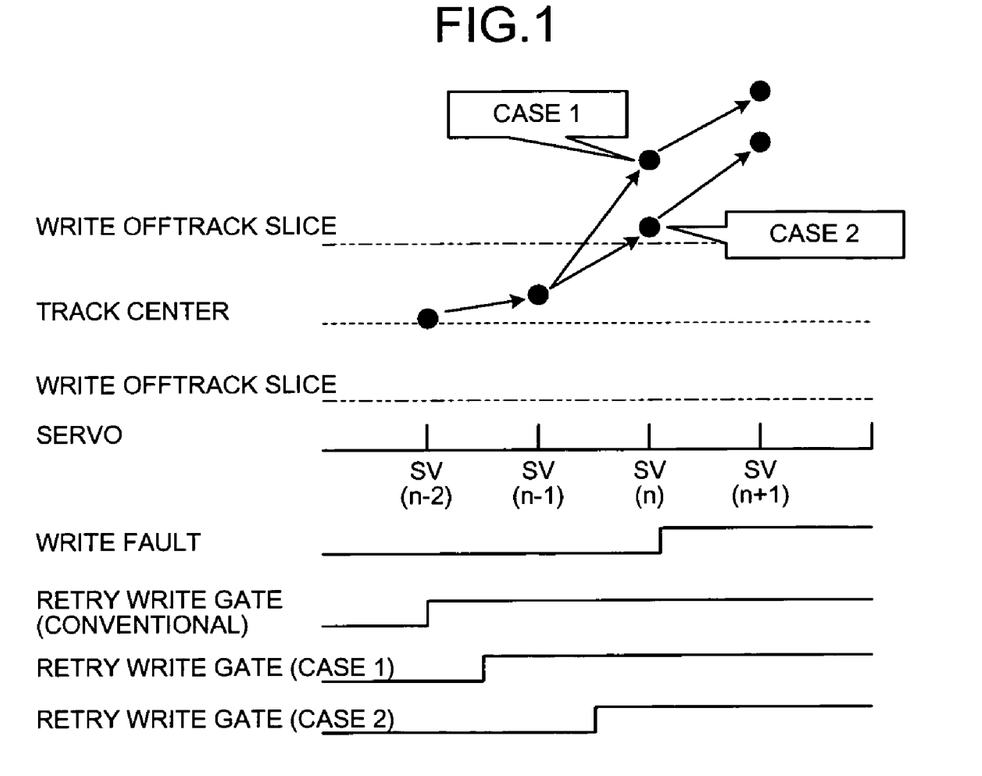
FIG. 1 is a schematic for explaining an overview and a salient feature of a magnetic disk apparatus according to an embodiment of the present invention.

FIG. 1 is a schematic for explaining an overview and a salient feature of the magnetic disk apparatus according to the embodiment. It is assumed that a write fault occurs in a servo frame SV(n), and a head position outreaches an end of a write offtrack slice between servo frames SV(n-1) and SV(n).

This pattern indicates that there is a possibility that a writing trajectory of data outreaches an end of the write offtrack slice after the servo frame SV(n-1). In Case 1 of FIG. 1, the offtrack amount in the servo frame SV(n) is large, i.e., larger than a first stipulated value. The first stipulated value is, for example, a distance between the track center and one end of the write offtrack slice in FIGS. 1, 3, and 4. Accordingly, in Case 1, the magnetic disk apparatus rewrites data in sectors that include the servo frame SV(n-1). In other words, the magnetic disk apparatus rewrites data in all the sectors between the servo frames SV(n-1) and SV(n). This rewriting process is similar to that performed by the conventional magnetic disk apparatus.

In Case 2 of FIG. 1, the offtrack amount in the servo frame SV(n) is comparatively small, i.e., smaller than the first stipulated value. This pattern indicates that the offtrack amount in a sector, in which data is written and which is immediately after the servo frame SV(n-1), is small, so that it is unnecessary to rewrite data. The magnetic disk apparatus rewrites data in not all of but only some of the sectors between the servo frames SV(n-1) and SV(n). For example, rewriting is started at a certain sector between the servo frames SV(n-1) and SV(n). In other words, the magnetic disk apparatus determines the rewrite sector count, for example, by deducting the first stipulated value from the total number of sectors between the servo frames SV(n-1) and SV(n)).

In this manner, the magnetic disk apparatus changes the rewrite sector count based on the offtrack amount at each servo frame. As a result, unnecessary rewriting can be avoided, and the performance of the magnetic disk apparatus can be improved.

Because the rewrite sector count is appropriately changed, the possibility of sectors spanning across a plurality of servo frames is eliminated, the number of servo frames at which rewriting of data is to be continuously successful within retry time can be reduced, making it possible to improve the performance and resistance of the magnetic disk apparatus when a disturbance is provoked in the magnetic disk apparatus such as when being subjected to jolts.

Figure 2:
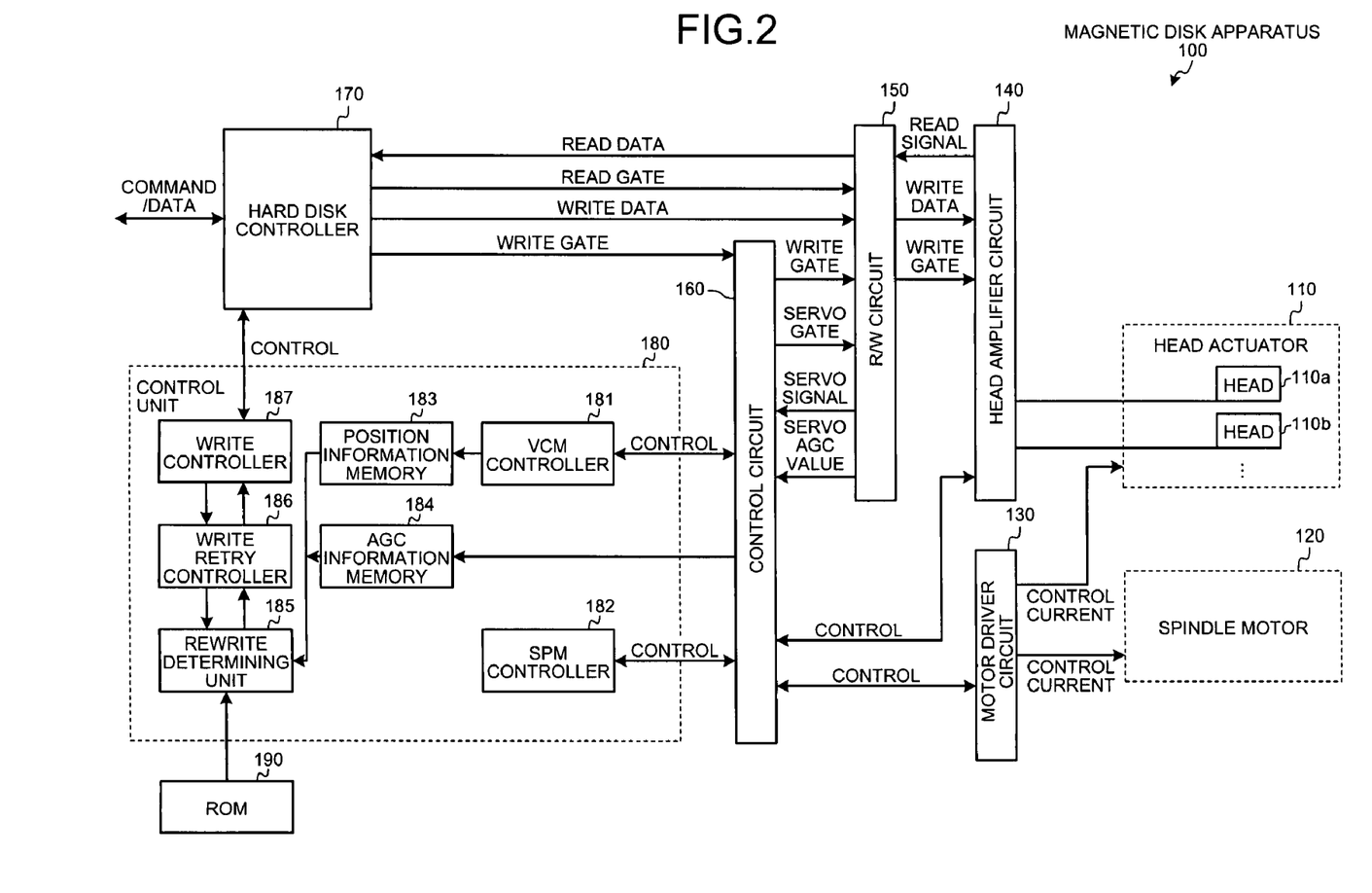
FIG. 2 is a functional block diagram of the magnetic disk apparatus shown in FIG. 1.

A configuration of a magnetic disk apparatus 100 according to the embodiment will be explained with reference to a functional block diagram shown in FIG. 2. The magnetic disk apparatus 100 includes a head actuator 110, a spindle motor 120, a motor driver circuit 130, a head amplifier circuit 140, a read/write (R/W) circuit 150, a control circuit 160, a hard disk controller 170, a control unit 180, and a read-only memory (ROM) 190.

The head actuator 110 actuates, i.e., "moves" heads 110a and 110b by a control current output from the motor driver circuit 130. Only two heads 110a and 110b are shown in FIG. 1 for the sake of convenience; however, generally there may be more than two heads.

The spindle motor 120 performs rotation control of the magnetic disk by a control current output from the motor driver circuit 130. The motor driver circuit 130 acquires a control instruction output from the control circuit 160 and outputs the control current to the head actuator 110 and the spindle motor 120 based on the control instruction.

The head amplifier circuit 140 acquires a control instruction from the control circuit 160, and also acquires write data (data to be written onto the magnetic disk) and write gate, i.e., data indicating a write timing for writing the data onto the magnetic disk from the R/W circuit 150. The head amplifier circuit 140 then writes the write data onto the magnetic disk via the head 110a or 110b. Moreover, the head amplifier circuit 140 acquires a read signal, i.e., data read from the magnetic disk via the head 110a or 110b and outputs the read signal to the R/W circuit 150.

The R/W circuit 150 performs various processes related to reading of data from and writing of data to the magnetic disk. Specifically, the R/W circuit 150 creates read data (having a constant output level) by amplifying the read signal output from the head amplifier circuit 140 and outputs the read data to the hard disk controller 170 according to read gate, i.e., data indicating a read timing for reading data from the magnetic disk output from the head disk controller 170. In addition, the R/W circuit 150 outputs the write data output from the hard disk controller 170 and the write gate output from the control circuit 160 to the head amplifier circuit 140.

Further, the R/W circuit 150 acquires servo gate, i.e., data indicating a read timing for reading a servo signal from the magnetic disk from, the control circuit 160 and outputs the servo signal to the control circuit 160. Though not shown in FIG. 2, the R/W circuit 150 acquires the servo signal via the head 110a or 110b and the head amplifier circuit 140 and outputs the servo signal to the control circuit 160. The servo signal contains information on the offtrack amount that indicates the amount of shift of the head 110a or 110b from the center of the track on the magnetic disk for each servo frame.

The R/W circuit 150 also outputs an amplification degree (a gain of the R/W circuit 150), by which each read signal is amplified, as a servo automatic gain control (AGC) value to the control circuit 160. The R/W circuit 150 adjusts the amplification degree so that the output level of the read data is maintained constant. Consequently, the R/W circuit 150 outputs a larger servo AGC value as the read signal gets smaller, and vice versa.

The control circuit 160 controls the motor driver circuit 130 and the head amplifier circuit 140 according to the control instruction from the control unit 180. The control circuit 160 acquires the write gate from the hard disk controller 170 and outputs the write gate to the R/W circuit 150. The control circuit 160 also outputs the servo gate to the R/W circuit 150, acquires the servo signal and the servo AGC value from the R/W circuit 150, and outputs the servo signal and the servo AGC value to the control unit 180.

The hard disk controller 170 receives various types of data/commands from a host computer, which is not shown, or from the control unit 180, and controls the entire magnetic disk apparatus 100 accordingly. In particular relevance to the present invention, in response to a write command from the host computer, the hard disk controller 170 outputs the write gate to the control circuit 160 and the write data to the R/W circuit 150. Similarly, in response to a read command from the host computer, the hard disk controller 170 outputs the read gate to the R/W circuit 150 and the read data acquired from the R/W circuit to the host computer.

Further, in response to a write retry command from the control unit 180, the hard disk controller 170 outputs to the R/W circuit 150 the write data to be rewritten to the sectors on the magnetic disk determined by the control unit 180, and outputs the write gate to the control circuit 160.

The control unit 180 has an internal memory for storing therein various types of control data and uses the data to perform various processes. In particular relevance to the present invention, the control unit 180, as shown in FIG. 2, includes a voice coil motor (VCM) controller 181, a spindle motor (SPM) controller 182, a position information memory 183, an AGC information memory 184, a rewrite determining unit 185, a write retry controller 186, and a write controller 187.

The VCM controller 181 acquires the servo signal from the control circuit 160, and outputs, based on the servo signal, a control instruction to the control circuit 160 to move the head 110a or 110b to the track on the magnetic disk from which data is to be read or onto which data is to be written. The VCM controller 181 stores the servo signal acquired from the control circuit 160 in the position information memory 183.

The SPM controller 182 outputs to the control circuit 160 a control instruction for adjusting the number of rotations of the spindle motor 120. The position information memory 183 stores therein the servo signal that contains the offtrack amount for every servo frame. The servo signal is stored in the position information memory 183 by the VCM controller 181. The AGC information memory 184 stores therein the servo AGC value output from the control circuit 160 for every servo frame.

The rewrite determining unit 185 determines whether data is to be rewritten based on the servo signal stored in the position information memory 183, and if data is to rewritten, determines the rewrite sector count.

Furthermore, the rewrite determining unit 185 determines whether data is to be rewritten based on a cause of a write fault, and determines the rewrite sector count. The rewrite determining unit 185 determines the cause of the write fault based on impact-related information detected by a shock sensor, which is not shown, circuit information regarding any fault in any of the circuits, and information on the offtrack amount.

If determining that the cause of the write fault is the offtrack amount, the rewrite determining unit 185 performs a first determination process or a second determination process. In the first determination process, the rewrite determining unit 185 determines whether data is to be rewritten based on the offtrack amount for each servo frame. In the second determination process, the rewrite determining unit 185 determines whether data is to be rewritten by estimating the offtrack amount at the next servo frame in the path of the head. The first determination process and the second determination process are explained below in detail.

Figure 3:
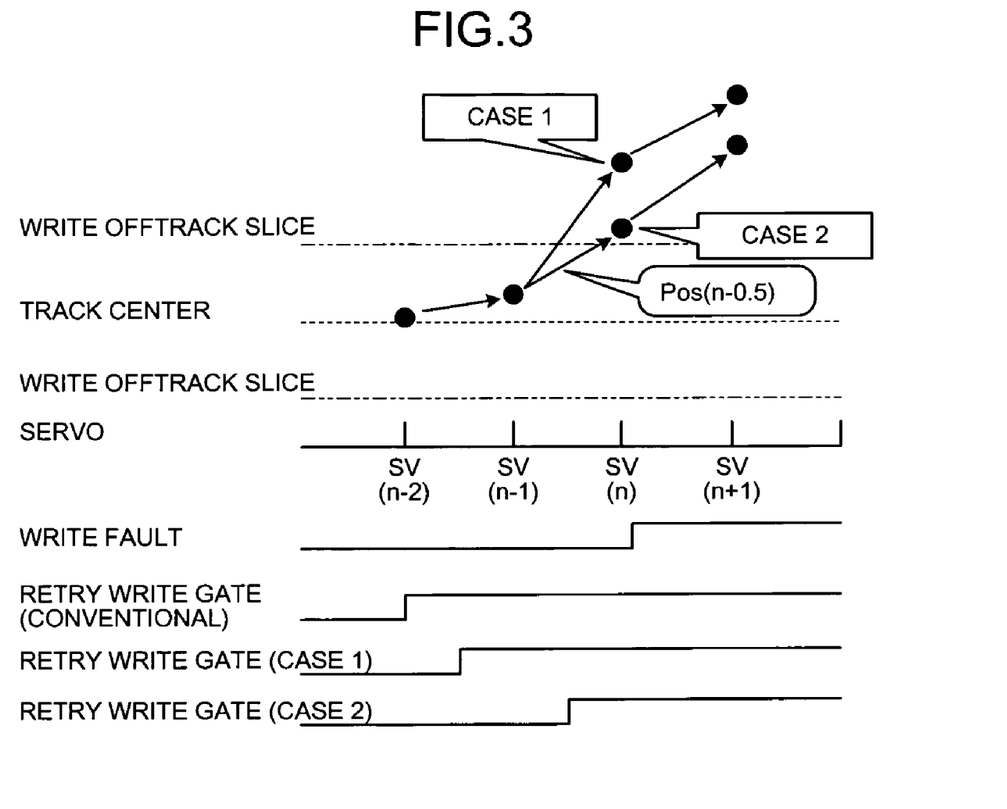
FIG. 3 is a schematic for explaining a first determination process.

FIG. 3 is a schematic for explaining the first determination process. In the first determination process, the rewrite determining unit 185 acquires the servo signal stored in the position information memory 183 and determines whether an offtrack amount is equal to or greater than the first stipulated value for every servo frame. The rewrite determining unit 185 is assumed to determine that the data is to be rewritten.

After determining that the data is to rewritten, the rewrite determining unit 185 determines the rewrite sector count. The example in FIG. 3 depicts a case of the offtrack amount exceeding the first stipulated value at the servo frame SV(n), indicating that a write fault has occurred at the servo frame SV(n).

In Case 1 shown in FIG. 3, the offtrack amount at the servo frame SV(n) has grossly exceeded the first stipulated value, the rewrite determining unit 185 determines that data needs to be rewritten in the sectors that include the servo frame SV(n-1), that is, all the sectors between the servo frames SV(n-1) and SV(n). Let us assume that the rewrite determining unit 185 determines that the rewrite sector count is five.

In Case 2 shown in FIG. 3, the offtrack amount at the servo frame SV(n) has only marginally exceeded the first stipulated value. This indicates that the offtrack amount immediately after the servo frame SV(n-1) is negligible, and there is no need to rewrite data in the sectors immediately after the servo frame SV(n-1). Thus, in Case 2, the rewrite determining unit 185 determines that it is necessary to rewrite data in not all but only some of the sectors between the servo frames SV(n-1) and SV(n). For example, the rewrite determining unit 185 determines that it is necessary to rewrite data in only four out of the five sectors between the servo frames SV(n-1) and SV(n).

A method of classifying a write fault as Case 1 or Case 2 is explained below. The rewrite determining unit 185 sets the offtrack amount at the servo track SV(n) as Pos(n) and calculates, by linear interpolation, an offtrack amount halfway between the servo tracks SV(n-1) and SV(n) as Pos(n-0.5). The rewrite determining unit 185 classifies the write fault as Case 1 or Case 2 based on the offtrack amount calculated by the linear interpolation.

An equation for calculating the Pos(n-0.5) by the linear interpolation is $Pos(n-0.5)=(Pos(n)-Pos(n-1)/2)+Pos(n-1)$.

If the value of Pos(n-0.5) is equal to or greater than the first stipulated value, the rewrite determining unit 185 takes it indicating that the offtrack amount of the data written immediately after the servo track SV(n-1) is large, and hence classifies the write fault as Case 1.

If the value of Pos(n-0.5) is smaller than the first stipulated value, the rewrite determining unit 185 takes it indicating that the offtrack amount of the data written immediately after the servo track SV(n-1) is small, and hence classifies the write fault as Case 2.

Figure 4:
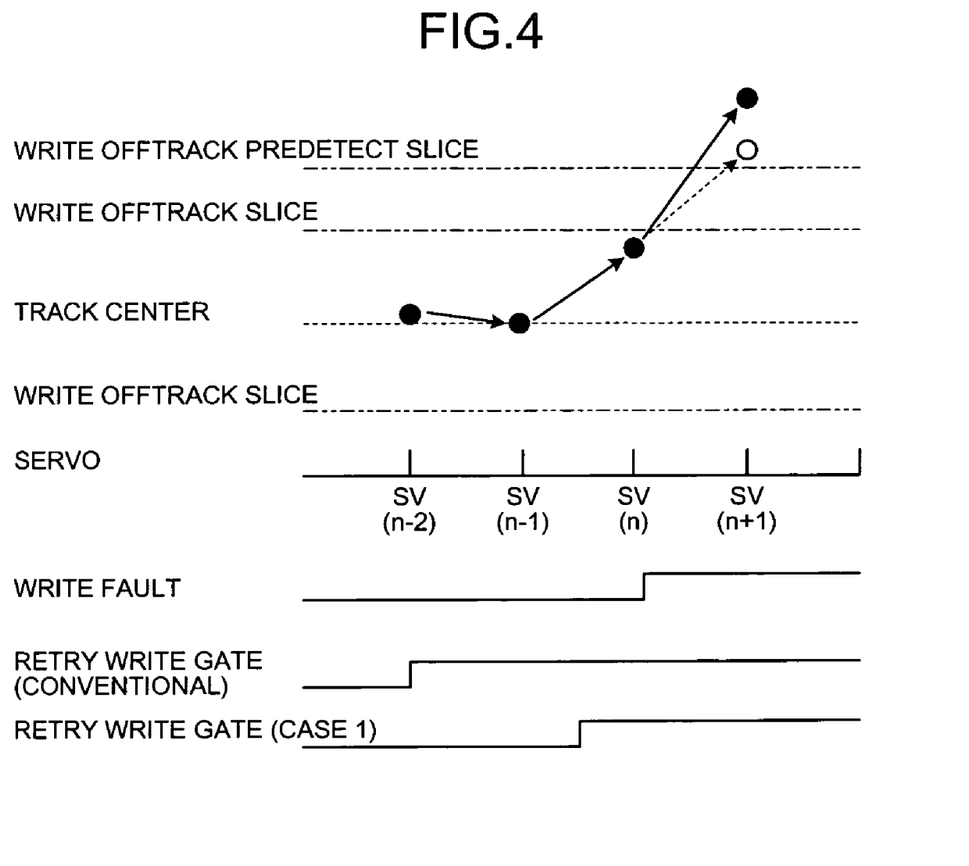
FIG. 4 is a schematic for explaining a second determination process.

The second determination process is explained below. FIG. 4 is a schematic for explaining the second determination process. In the second determination process, the rewrite determining unit 185 calculates, i.e., 'estimates' an offtrack amount at the next servo frame based on the servo signal recorded in the position information memory 183, and determines whether the calculated offtrack amount is equal to or greater than a second stipulated value. The second stipulated value is, for example, a distance between the track center and an end of a write offtrack predetect slice in FIG. 4. If the offtrack amount is equal to or greater than the second stipulated value, the rewrite determining unit 185 determines that the writing process should stop and that data rewriting should be performed.

If SV(n) is the current servo frame, the servo frame at which an offtrack amount is to be estimated would be SV(n+1). An equation used for calculating the offtrack amount at the next servo frame can, for instance, be $SV(n+1)=SV(n)+(SV(n)-SV(n-1))$.

In the second determination process, if determining that the writing process should stop, the rewrite determining unit 185 determines that data rewriting is to be performed beginning from a sector in which data is written immediately after the current servo frame. If the current servo frame is SV(n), the rewrite determining unit 185 determines that data rewriting should be performed beginning from the sector immediately after the servo frame SV(n). Let us assume that the rewrite determining unit 185 determines that the rewrite sector count is two or one.

Apart from using the equation, an estimate can be made of the head position by an observer for estimating the offtrack amount at the next servo frame, after which it can be determined whether data writing is to be stopped and data rewriting is to be performed.

The rewrite determining unit 185 then determines the rewrite sector count, i.e., the number of sectors in which data is to be rewritten because of interrupted writing process. The rewrite determining unit 185, for example, determines the cause of the write fault based on any one of or a combination of information including a shock signal output from the shock sensor when the magnetic disk apparatus 100 receives a jolt and circuit information regarding a fault in a circuit such as amplifier information that indicates whether the head amplifier circuit 140 malfunctions, and determines the rewrite sector count. As an example of a standard of determination in this case, if the magnetic disk apparatus 100 receives a jolt and the head amplifier circuit 140 thereby malfunctions, that is, if the write fault is caused by a jolt to the magnetic disk apparatus 100 and the malfunctioning of the head amplifier circuit 140, the rewrite determining unit 185 determines that data in two sectors needs to be rewritten. However, if only one condition occurs, that is, either the magnetic disk apparatus 100 receives a jolt or the head amplifier circuit 140 malfunctions, the rewrite determining unit 185 determines that data in one sector needs to be rewritten.

Thus, the rewrite sector count can be determined more accurately by determining the cause of the write fault garnered from the shock signal from the shock sensor, the amplifier information from the head amplifier circuit 140 and the like.

Returning to FIG. 2, the write retry controller 186 inquires the rewrite determining unit 185 whether rewriting is to be performed. If the rewrite determining unit 185 determines that rewriting is to be performed, the write retry controller 186 acquires from the rewrite determining unit 185 the rewrite sector count and outputs the rewrite sector count as a retry condition to the write controller 187.

The write controller 187 outputs the retry condition to the hard disk controller 170 during the rewriting process, enabling write retry to take place. Specifically, when the write retry controller 186 outputs the inquiry regarding whether rewriting is to be performed to the rewrite determining unit 185 and the write controller 187 acquires the retry condition from the write retry controller 186, the write controller 187 determines that write retry is to be performed and outputs the retry condition to the hard disk controller 170.

The ROM 190 stores therein the data and programs required by the control unit 180 for performing various processes.

Figure 5:
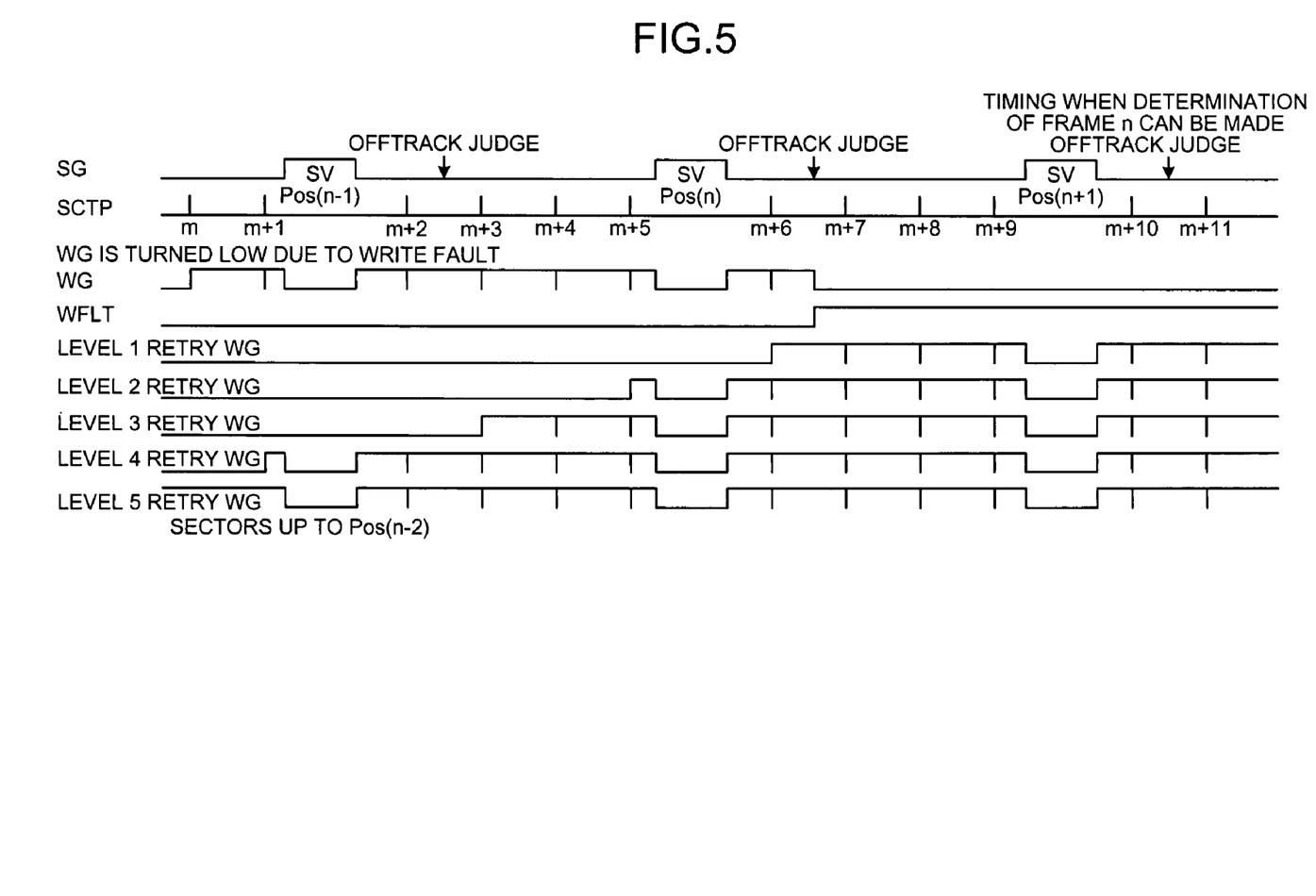
FIG. 5 is a schematic for explaining an example of write gate and timings indicated by servo frames for different rewrite sector counts.

FIG. 5 is an example of the write gate and the timings of the servo frames for different rewrite sector counts. Symbol SG in the first row in FIG. 5 indicates the servo gate, and when the value of the servo gate is high, the head is on the servo frame. A timing of the SG labeled Offtrack judge is when it is determined whether a write fault has occurred. When the SG is high, it acts as a trigger for the Offtrack judge to be performed.

Symbol SCTP in the second row in FIG. 5 indicates the sectors on the magnetic disk. Symbol WG in the third row indicates the write gate. Symbol WFLT in the fourth row indicates the timing of the write fault. In the example shown in FIG. 5, the write fault occurs between SCTP m+6 and m+7.

Level 1 retry WG to Level 5 retry WG in FIG. 5 indicate write gate signals for the respective rewrite sector counts. Level 1 retry WG is the write gate signal when the rewrite sector count is one, and in the example shown in FIG. 5, rewriting is performed from SCTP m+6. Level 2 retry WG is the write gate signal when the rewrite sector count is two, and in FIG. 5, rewriting is performed from SCTP m+5. Level 3 retry WG is the write gate signal when the rewrite sector count is four, and in FIG. 5, rewriting is performed from SCTP m+3.

Level 4 retry WG is the write gate signal when the rewrite sector count is five, and in FIG. 5, rewriting is performed from SCTP m+1. Level 5 retry WG is the write gate signal when the sectors to be rewritten start immediately after Pos(n−2).

The magnetic disk apparatus 100 performs rewriting using the level 4 retry WG signal if the rewrite determining unit 185 determines in the first determination. process that the write fault falls under Case 1. The magnetic disk apparatus 100 performs rewriting using the level 3 retry WG signal if the rewrite determining unit 185 determines in the first determination process that the write fault falls under Case 2.

The magnetic disk apparatus 100 performs rewriting using the level 2 retry WG or the level 1 retry WG if the rewrite determining unit 185 determines in the second determination process that rewriting is to be performed.

The conventional magnetic disk apparatus always performs rewriting using either the level 4 retry WG or the level 5 retry WG. However, in the magnetic disk apparatus according to the embodiment of the present invention, the rewrite sector count varies according to circumstances. Therefore, sectors in which data does not need to be rewritten are left alone, preventing performance deterioration of the magnetic disk apparatus 100.

Figure 6:
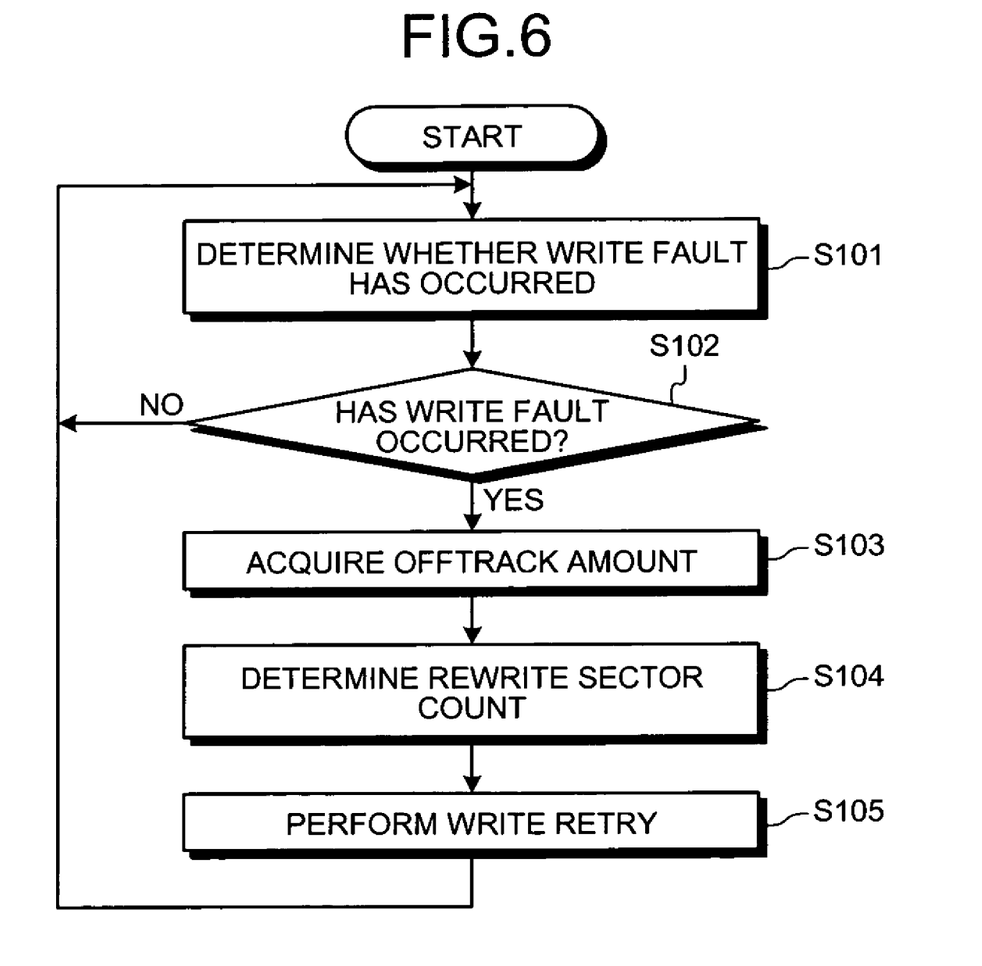
FIG. 6 is a flowchart of a process procedure performed by the magnetic disk apparatus for determining a rewrite sector count.

A process procedure of the magnetic disk apparatus 100 for determining the rewrite sector count is explained below with reference to FIG. 6. The rewrite determining unit 185 of the magnetic disk apparatus 100 acquires the servo signal from the position information memory 183 and determines if a write fault has occurred (step S101). If no write fault has occurred (No at step S102), the rewrite determining unit 185 repeats step S101.

If a write fault has occurred (Yes at step S102), the rewrite determining unit 185 acquires the offtrack amount corresponding to each servo frame from the position information memory 183 (step S103) and determines the rewrite sector count (step S104). The rewrite determining unit 185 performs either the first determination process or the second determination process at step S104 to determine the rewrite sector count.

The write controller 187 acquires the rewrite sector count from the rewrite determining unit 185 via the write retry controller 186, and performs write retry (step S105).

Thus, when a write fault occurs, the rewrite determining unit 185 determines the rewrite sector count and the write controller 187 performs rewriting. As a result, the performance of the magnetic disk apparatus 100 can be improved.

Thus, in the magnetic disk apparatus 100 according to the embodiment, the rewrite determining unit 185 acquires the servo signal containing the offtrack amount corresponding to each servo frame from the position information memory 183, and determines whether a write fault has occurred based on the servo signal. If a write fault has occurred, the rewrite determining unit 185 determines the rewrite sector count. The write controller 187 then control the hard disk controller 170 accordingly so that rewriting is performed based on the rewrite sector count determined by the rewrite determining unit 185. Consequently, unnecessary rewriting is done away with, improving the performance of the magnetic disk apparatus 100.

Furthermore, by restricting rewriting to only those sectors in which data needs to be rewritten, the magnetic disk apparatus 100 according to the embodiment eliminates the possibility of the rewrite sectors spilling over to adjoining servo frames, thus reducing the number of servo frames that have to be continuously handled for successful rewriting at retry time and improving the performance and resistance of the magnetic disk apparatus 100 even under adverse conditions such as when subjected to jolts or external shock.

The various process explained in the embodiment can be realized by execution of a program prepared in advance by a central processing unit (CPU) (or a micro control unit (MCU) or a micro processing unit (MCU)) provided in the magnetic disk apparatus 100. Programs for executing the various processes shown in FIG. 2 can be stored in the RAM 190, and the processes can be realized by causing the control unit 180 to read the programs from the ROM 190.

The programs need not necessarily be installed in the ROM 190 but can be read by the control unit 180 from a portable physical medium such as flexible disk (FD), compact disk-read-only memory (CD-ROM), digital versatile disk (DVD), a magnetooptical disk or an integrated circuit (IC) card that can be inserted into the host computer. Alternatively, the program can be stored in a non-portable physical medium such as hard disk device (HDD) provided in the host computer internally or externally, or on another computer (or server) connected to the computer over the public line, the Internet, the local area network (LAN), or the wide area network (WAN).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

All the automatic processes explained in the embodiment can be, entirely or in part, carried out manually. Similarly, all the manual processes explained in the embodiment can be entirely or in part carried out automatically by a well-known method.

The process procedures, the control procedures, specific names, and data, including various parameters mentioned in the description and drawings can be changed as required unless otherwise specified.

The constituent elements of the apparatus illustrated are merely conceptual and may not necessarily physically resemble the structures shown in the drawings. For example, the apparatus need not necessarily have the structure that is illustrated. The apparatus as a whole or in parts can be distributed or integrated either functionally or physically according to the load or how the apparatus is to be used.

The process functions performed by the apparatus are entirely or partially realized by the CPU or a computer program executed by the CPU or by a hardware using wired logic.

According to an aspect of the present invention, unnecessary rewriting is not performed, thereby improving the performance of the storage apparatus. Furthermore, by restricting rewriting to only those sectors in which data needs to be rewritten, the possibility of the rewrite sectors spilling over to adjoining servo frames is eliminated, thus reducing the number of servo frames that have to be continuously handled for successful rewrites during retry and improving the performance of the storage apparatus under adverse conditions such as when subjected to jolts or external shock.

According to another aspect of the present invention, the rewrite sector count can be determined more accurately and more efficient rewriting can be ensured.

According to still another aspect of the present invention, the number of sectors in which data is to be rewritten can be minimized and rewriting can be carried out efficiently.

According to still another aspect of the present invention, when a write fault occurs, the magnetic disk apparatus determines the rewrite sector count and performed rewriting according to the rewrite sector count. As a result, spilling over the rewrite data sectors to adjacent servo frames is prevented, enabling rewriting to be performed smoothly. A high success rate of data rewriting improves the reliability of the magnetic disk apparatus, particularly in portable apparatus that are likely to be carried when traveling and that are likely to receive jolts, be dropped, or be exposed to variations in atmospheric pressure.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus that controls a storage apparatus to rewrite data when a write fault occurs while the data is being written to a storage medium included in the storage apparatus, the control apparatus comprising:
    a fault-cause determining unit that determines a cause of the write fault; and
    a sector-count determining unit that determines number of sectors in which the data is to be rewritten according to the cause,
    wherein the sector-count determining unit determines the number of sectors based on:
    shock data output from a shock sensor of the storage apparatus when the storage apparatus receives a shock, and
    amplifier information indicating whether a malfunction has occurred in a head amplifier that is included in the storage apparatus and that processes a write signal used by the head for writing the data.

2. The control apparatus according to claim 1, wherein the fault-cause determining unit determines the cause based on at least one of: an offtrack amount indicating an amount of shift of a head of the storage apparatus from a center of a track on the storage medium,
    a shock detected by the shock sensor of the storage apparatus, and
    circuit information pertaining to a circuit malfunction of the storage apparatus.

3. The control apparatus according to claim 2, further comprising an offtrack-amount detecting unit that detects the offtrack amount for every servo frame using a plurality of servo frames recorded on the storage medium.

4. A storage apparatus that rewrites data when a write fault occurs while the data is being written to a storage medium included in the storage apparatus, the storage apparatus comprising:
    a fault-cause determining unit that determines a cause of the write fault; and
    a sector-count determining unit that determines number of sectors in which the data is to be rewritten according to the cause,
    wherein the sector-count determining unit determines the number of sectors based on:
    shock data output from a shock sensor of the storage apparatus when the storage apparatus receives a shock, and
    amplifier information indicating whether a malfunction has occurred in a head amplifier that is included in the storage apparatus and that processes a write signal used by the head for writing the data.

5. The storage apparatus according to claim 4, wherein the fault-cause determining unit determines the cause based on at least one of:
- an offtrack amount indicating an amount of shift of a head of the storage apparatus from a center of a track on the storage medium,
- a shock detected by the shock sensor of the storage apparatus, and circuit information pertaining to a circuit malfunction of the storage apparatus.

6. The storage apparatus according to claim 5, further comprising an offtrack-amount detecting unit that detects the offtrack amount for every servo frame using a plurality of servo frames recorded on the storage medium.

7. A computer-readable recording medium that stores therein a computer program that causes a computer to rewrite data when a write fault occurs while the data is being written to a storage medium included in a storage apparatus, the computer program causes the computer to execute:
- determining a cause of the write fault; and
- determining number of sectors in which the data is to be rewritten according to the cause,
- wherein the determining includes determining the number of sectors based on:
  - shock data output from a shock sensor of the storage apparatus when the storage apparatus receives a shock, and
  - amplifier information indicating whether a malfunction has occurred in a head amplifier that is included in the storage apparatus and that processes a write signal used by the head for writing the data.

8. The computer-readable recording medium according to claim 7, wherein the determining includes determining the cause based on at least one of:
- an offtrack amount indicating an amount of shift of a head of the storage apparatus from a center of a track on the storage medium,
- a shock detected by the shock sensor of the storage apparatus, and
- circuit information pertaining to a circuit malfunction of the storage apparatus.

9. The computer-readable recording medium according to claim 8, further causing the computer to execute detecting the offtrack amount for every servo frame using a plurality of servo frames recorded on the storage medium.

* * * * *